(12) United States Patent
Seo et al.

(10) Patent No.: US 10,244,493 B2
(45) Date of Patent: Mar. 26, 2019

(54) METHOD FOR TRANSMITTING AND RECEIVING SYNCHRONIZATION SIGNAL IN WIRELESS COMMUNICATION SYSTEM AND DEVICE FOR PERFORMING SAME

(71) Applicant: LG ELECTRONICS INC., Seoul (KR)

(72) Inventors: Inkwon Seo, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 15/505,585

(22) PCT Filed: Aug. 25, 2015

(86) PCT No.: PCT/KR2015/008864
§ 371 (c)(1),
(2) Date: Feb. 21, 2017

(87) PCT Pub. No.: WO2016/032202
PCT Pub. Date: Mar. 3, 2016

(65) Prior Publication Data
US 2017/0273041 A1 Sep. 21, 2017

Related U.S. Application Data

(60) Provisional application No. 62/042,237, filed on Aug. 26, 2014.

(51) Int. Cl.
*H04W 56/00* (2009.01)
*H04J 11/00* (2006.01)
*H04W 76/14* (2018.01)

(52) U.S. Cl.
CPC .......... *H04W 56/001* (2013.01); *H04J 11/00* (2013.01); *H04W 56/00* (2013.01); *H04W 76/14* (2018.02)

(58) Field of Classification Search
None
See application file for complete search history.

(56) References Cited

U.S. PATENT DOCUMENTS

| 9,743,359 B2* | 8/2017 | Webb ...................... H04W 4/70 |
| 2010/0110873 A1* | 5/2010 | Han ..................... H04J 13/0062 370/208 |

(Continued)

FOREIGN PATENT DOCUMENTS

WO 2015042872 4/2015

OTHER PUBLICATIONS

Samsung, "Discussion on D2DSS Design", 3GPP TSG RAN WG1 Meeting #78, R1-143098, Aug. 2014, 6 pages.

(Continued)

*Primary Examiner* — Anh Ngoc M Nguyen
(74) *Attorney, Agent, or Firm* — Lee Hong Degerman Kang Waimey

(57) ABSTRACT

A method for a device to device (D2D) communication-supporting user equipment detecting a synchronization signal, according to one embodiment of the present invention, comprises the steps of: on the basis of a first index set having a plurality of root indexes on a Zadoff-Chu sequence, detecting a first synchronization signal transmitted by a network; and, on the basis of a second index set having a plurality of root indexes that are different from the first index set, detecting a second synchronization signal transmitted by a D2D synchronization source, wherein the total number of the root indexes of the second index set is configured to be the total number of the root indexes of the first index set −1.

11 Claims, 11 Drawing Sheets

(a)

(b)

(56) References Cited

U.S. PATENT DOCUMENTS

| | | | | |
|---|---|---|---|---|
| 2010/0296429 | A1* | 11/2010 | Han | H04L 12/189 370/312 |
| 2012/0231805 | A1* | 9/2012 | Wang | H04J 11/0073 455/452.1 |
| 2014/0064263 | A1 | 3/2014 | Cheng et al. | |
| 2014/0219270 | A1* | 8/2014 | Ro | H04W 56/002 370/350 |
| 2014/0323126 | A1* | 10/2014 | Ro | H04W 8/005 455/434 |

OTHER PUBLICATIONS

QUALCOMM, "Signal Design for D2D Synchronization", 3GPP TSG RAN WG1 Meeting #78, R1-142964, Aug. 2014, 10 pages.
Nokia, "D2D synchronization signal design", 3GPP TSG RAN WG1 Meeting #76bis, R1-141541, Apr. 2014, 4 pages.
Nokia, "On D2D synchronization design", 3GPP TSG RAN WG1 Meeting #76, R1-140571, Feb. 2014, 6 pages.
ZTE, "Synchronization Design for D2D Broadcast Communication", 3GPP TSG RAN WG1 Meeting #76, R1-140269, Feb. 2014, 11 pages.
European Patent Office Application Serial No. 15835688.1, Search Report dated Apr. 10, 2018, 11 pages.
Samsung, "D2D synchronization signal and channel design, considering information indication", 3GPP TSG RAN WG1 Meeting #78, R1-143100, Aug. 2014, 7 pages.
Huawei, et al., "D2D synchronization procedure for out-of-coverage", 3GPP TSG RAN WG1 Meeting #78, R1-142845, Aug. 2014, 7 pages.
ZTE, "D2D Synchronization Signal and Channel Design", 3GPP TSG RAN WG1 Meeting #78, R1-143142, Aug. 2014, 6 pages.
PCT International Application No. PCT/KR2015/008864, Written Opinion of the International Searching Authority dated Feb. 23, 2016, 25 pages.
ITL Inc., "Details on D2D synchronization signal design", R1-143289, 3GPP TSG RAN WG1 Meeting #78, Aug. 2014, 6 pages.
ITL Inc., "Considerations on D2D synchronization signal design", R1-141520, 3GPP TSG RAN WG1 Meeting #76bis, Apr. 2014, 4 pages.
Alcatel-Lucent, "Resource Allocation and Design for D2D Synchronization Signals", R1-143024, 3GPP TSG RAN WG1 Meeting #78, Aug. 2014, 8 pages.
Alcatel-Lucent, "Considerations on D2D synchronization signal design", R1-141260, 3GPP TSG RAN WG1 Meeting #76bis, Apr. 2014, 3 pages.

* cited by examiner

FIG. 5
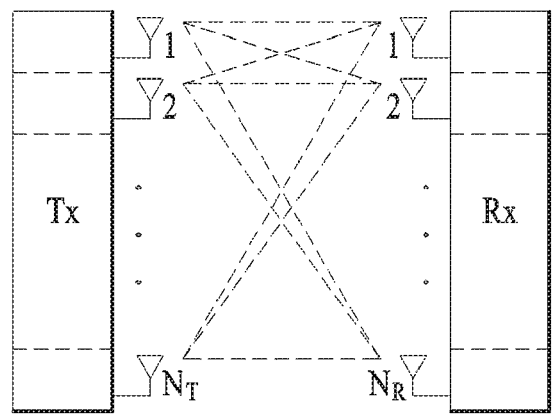
(a)
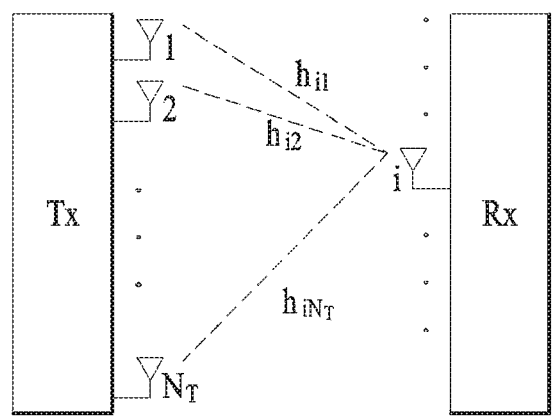
(b)

METHOD FOR TRANSMITTING AND RECEIVING SYNCHRONIZATION SIGNAL IN WIRELESS COMMUNICATION SYSTEM AND DEVICE FOR PERFORMING SAME

CROSS-REFERENCE TO RELATED APPLICATIONS

This application is the National Stage filing under 35 U.S.C. 371 of International Application No. PCT/KR2015/008864, filed on Aug. 25, 2015, which claims the benefit of U.S. Provisional Application No. 62/042,237, filed on Aug. 26, 2014, the contents of which are all hereby incorporated by reference herein in their entirety.

TECHNICAL FIELD

The present invention relates to a wireless communication system, and more particularly, to a method for receiving or transmitting a synchronization signal by a user equipment (UE) that supports D2D communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention is to provide a method for performing D2D synchronization by transmitting and receiving a D2D synchronization signal to and from a UE that supports D2D communication.

The technical objects that can be achieved through the present invention are not limited to what has been particularly described hereinabove and other technical objects not described herein will be more clearly understood by persons skilled in the art from the following detailed description.

Technical Solution

To achieve the aforementioned technical object, according to one aspect of the present invention, a method for detecting synchronization signals by a user equipment (UE) that supports device to device (D2D) communication comprises detecting a first synchronization signal transmitted from a network based on a first index set having a plurality of root indexes for a Zadoff-Chu sequence; and detecting a second synchronization signal transmitted from a D2D synchronization source based on a second index set having a plurality of root indexes which are different from the plurality of root indexes of the first index set, wherein a total number of the root indexes of the second index set is configured to be a total number of the root indexes of the first index set −1.

Preferably, a first root index included in the second index set may indicate that the D2D synchronization source is out of coverage of the network, and a second root index included in the second index set may indicate that the D2D synchronization source is within coverage of the network.

Preferably, the first synchronization signal may include a primary synchronization signal (PSS) mapped on a downlink resource, and the second synchronization signal may include a PD2DSS (primary D2D synchronization signal) mapped on an uplink resource.

Preferably, the first synchronization signal may be transmitted in an orthogonal frequency division multiple access (OFDMA) scheme, and the second synchronization signal may be transmitted in a single carrier-frequency division multiple access (SC-FDMA) scheme.

Preferably, the total number of the root indexes of the first index set may be 3, and the total number of the root indexes of the second index set may be 2.

Preferably, the first index set may include root indexes '25', '29' and '34', and the second index set may include root indexes '26' and '37'.

Preferably, a sum of a first root index and a second root index, which are included in the second index set, may be configured to correspond to a length of the Zadoff-Chu sequence.

Preferably, at least one of the plurality of root indexes included in the second index set may be configured to a value having a root symmetric property with respect to at least one of the plurality of root indexes included in the first index set.

Preferably, a first root index of the plurality of root indexes included in the second index set may be used within coverage of the network, when a sum of the first root index and a predetermined root index included in the first index set is '63', and a second root index of the plurality of root indexes included in the second index set may be used out of coverage of the network, when a sum of the second root index and the predetermined root index included in the first index set is not '63'.

Preferably, the detection of the second synchronization signal may be performed when detection of the first synchronization signal is failed.

Preferably, the method may further comprise transmitting the second synchronization signal based on the second index set when both detection of the first synchronization signal and detection of the second synchronization signal are failed.

To achieve the aforementioned technical object, according to another aspect of the present invention, a method for transmitting a device to device (D2D) synchronization signal from a UE that supports D2D communication comprises detecting a first synchronization signal transmitted from a network based on a first index set having a plurality of root indexes for a Zadoff-Chu sequence; generating a second synchronization signal based on a second index set having a plurality of root indexes which are different from the plurality of root indexes of the first index set; and transmitting the generated second synchronization signal, wherein a total number of the root indexes of the second index set is configured to be a total number of the root indexes of the first index set −1.

Preferably, generating the second synchronization signal may include generating the second synchronization signal by using a first root index included in the second index set if the UE is out of coverage of the network, and generating the second synchronization signal by using a second root index included in the second index set if the UE is within coverage of the network.

To achieve the aforementioned technical object, according to still another aspect of the present invention, a UE for supporting device to device (D2D) communication comprises a receiver for receiving a radio frequency (RF) signal; and a processor for controlling the receiver, wherein the processor detects a first synchronization signal transmitted from a network based on a first index set having a plurality of root indexes for a Zadoff-Chu sequence and detects a second synchronization signal transmitted from a D2D synchronization source based on a second index set having a plurality of root indexes which are different from the plurality of root indexes of the first index set, and a total number of the root indexes of the second index set is configured to be a total number of the root indexes of the first index set −1.

To achieve the aforementioned technical object, according to further still another aspect of the present invention, a UE for supporting device to device (D2D) communication comprises a processor for detecting a first synchronization signal transmitted from a network based on a first index set having a plurality of root indexes for a Zadoff-Chu sequence and generating a second synchronization signal based on a second index set having a plurality of root indexes which are different from the plurality of root indexes of the first index set; and a transmitter for transmitting the generated second synchronization signal, wherein a total number of the root indexes of the second index set is configured to be a total number of the root indexes of the first index set −1.

Advantageous Effects

According to one embodiment of the present invention, an in-coverage source and an out-coverage source are identified from each other through a root index of a D2D synchronization signal, which is defined differently from root indexes of a PSS, whereby a UE which supports D2D communication can efficiently perform D2D synchronization.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention, illustrate embodiments of the invention and together with the description serve to explain the principle of the invention.

FIG. 5 is a diagram showing the configuration of a wireless communication system having multiple antennas.

BEST MODE FOR CARRYING OUT THE INVENTION

Figure 1:
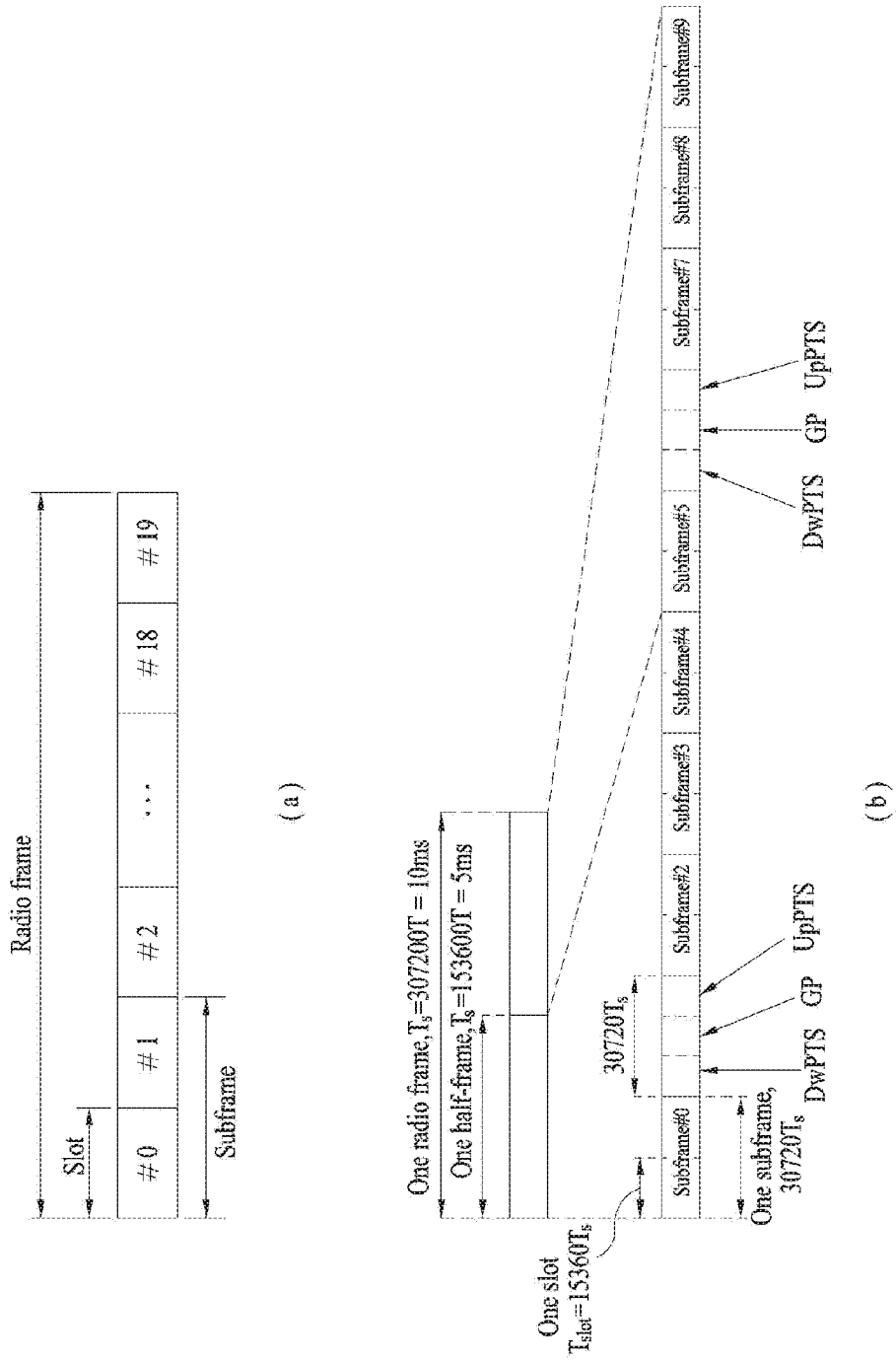
FIG. 1 is a diagram showing the structure of a radio frame.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

The term "cell", as used herein, may be applied to transmission and reception points such as a base station (eNB), sector, remote radio head (RRH) and relay, and may also be extensively used by a specific transmission/reception point to distinguish between component carriers.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
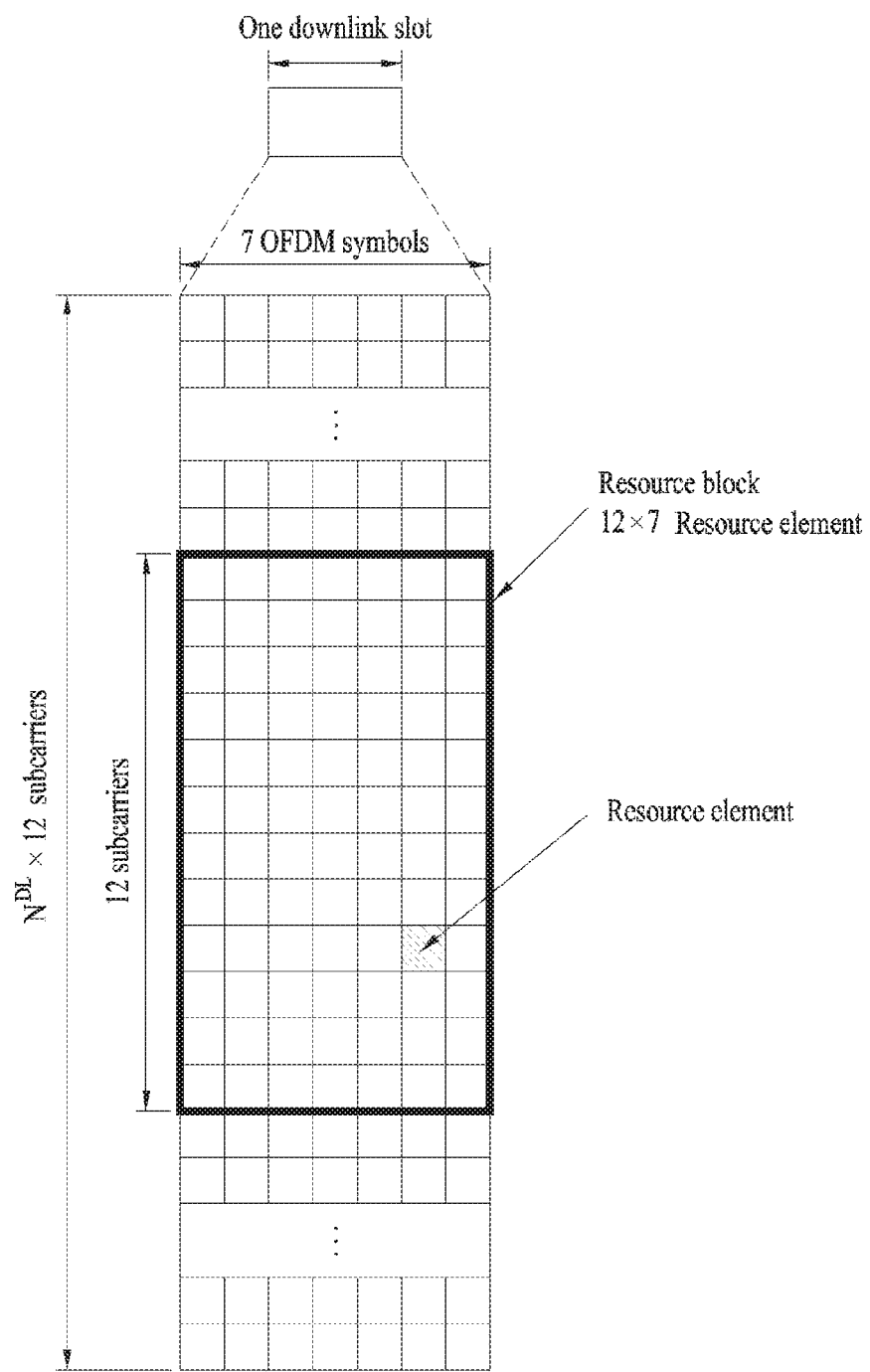
FIG. 2 is a diagram showing a resource grid in a downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
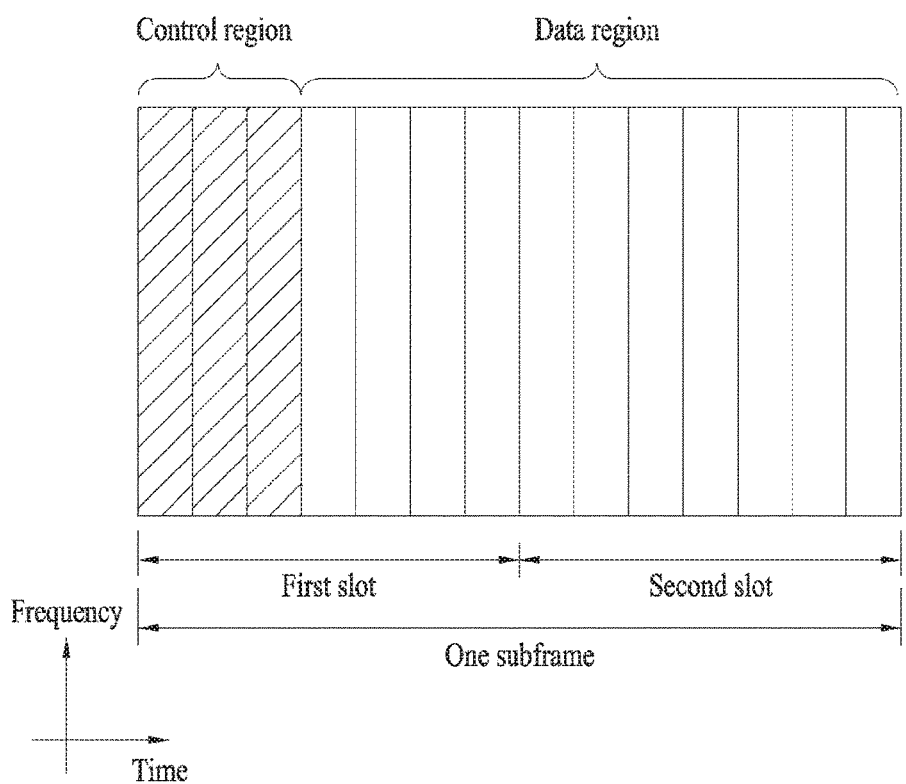
FIG. 3 is a diagram showing the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
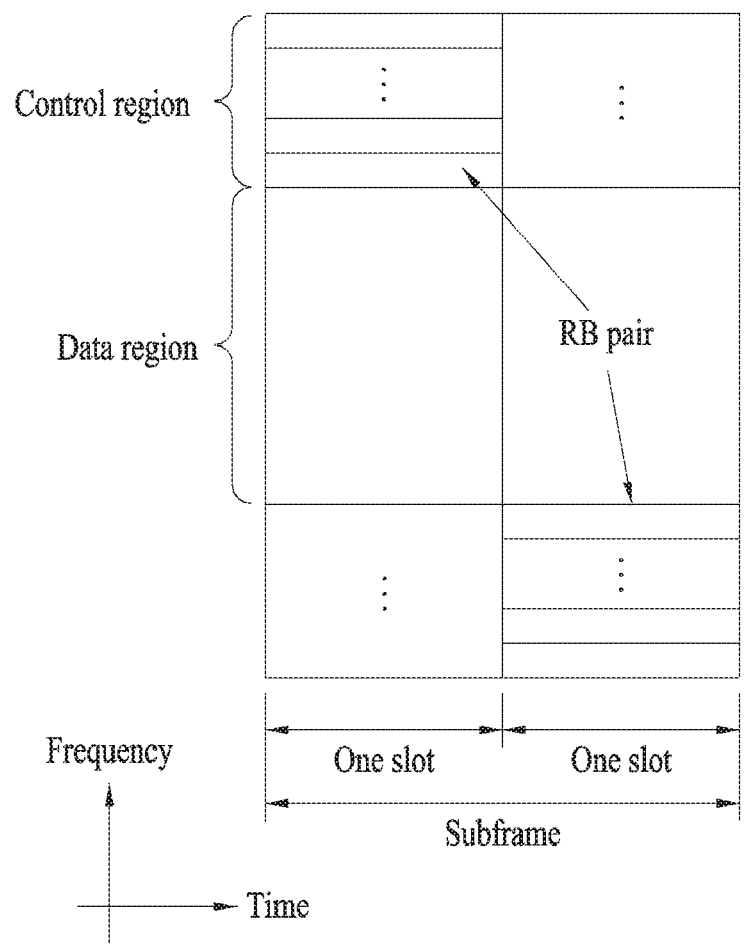
FIG. 4 is a diagram showing the structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

Modeling of MIMO System

FIG. 5 is a diagram illustrating a configuration of a wireless communication system having multiple antennas.

As shown in FIG. 5(a), if the number of transmit antennas is increased to NT and the number of receive antennas is increased to NR, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses 4 transmit antennas and 4 receive antennas, a transmission rate 4 times higher than that of a single antenna system can be obtained. Since this theoretical capacity increase of the MIMO system has been proved in the middle of 90's, many ongoing efforts are made to various techniques to substantially improve a data transmission rate. In addition, these techniques are already adopted in part as standards for various wireless communications such as 3G mobile communication, next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. It is assumed that there are NT transmit antennas and NR receive antennas.

Regarding a transmitted signal, if there are NT transmit antennas, the maximum number of pieces of information that can be transmitted is NT. Hence, the transmission information can be represented as shown in Equation 2.

$$s[s_1, s_2, \ldots, s_{N_T}]^T \qquad \text{[Equation 2]}$$

Meanwhile, transmit powers can be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers can be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

In addition, $\hat{S}$ can be represented as Equation 4 using diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Assuming a case of configuring NT transmitted signals $x_1, x_2, \ldots, x_{N_T}$, which are actually transmitted, by applying weight matrix W to the information vector S having the adjusted transmit powers, the weight matrix W serves to appropriately distribute the transmission information to each antenna according to a transport channel state. $x_1, x_2, \ldots, x_{N_T}$ can be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T 1} & w_{N_T 2} & \ldots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

In Equation 5, $w_{ij}$ denotes a weight between an $i^{th}$ transmit antenna and $j^{th}$ information. W is also called a precoding matrix.

If the NR receive antennas are present, respective received signals $y_1, y_2, \ldots, Y_{N_R}$ of the antennas can be expressed as follows.

$$y = [y_1, y_2, \ldots, y_{N_R}]^T \qquad \text{[Equation 6]}$$

If channels are modeled in the MIMO wireless communication system, the channels may be distinguished according to transmit/receive antenna indexes. A channel from the transmit antenna j to the receive antenna i is denoted by $h_{ij}$. In $h_{ij}$, it is noted that the indexes of the receive antennas precede the indexes of the transmit antennas in view of the order of indexes.

FIG. 5(b) is a diagram illustrating channels from the NT transmit antennas to the receive antenna i. The channels may be combined and expressed in the form of a vector and a matrix. In FIG. 5(b), the channels from the NT transmit antennas to the receive antenna i can be expressed as follows.

$$h_i^T = [h_{i1}, h_{i2}, \ldots, h_{iN_T}] \qquad \text{[Equation 7]}$$

Accordingly, all channels from the NT transmit antennas to the NR receive antennas can be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \qquad \text{[Equation 8]}$$

An AWGN (Additive White Gaussian Noise) is added to the actual channels after a channel matrix H. The AWGN $n_1, n_2, \ldots, n_{N_R}$ respectively added to receive antennas can be expressed as follows.

$$n = [n_1, n_2, \ldots, n_{N_R}]^T \qquad \text{[Equation 9]}$$

Through the above-described mathematical modeling, the received signals can be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = \qquad \text{[Equation 10]}$$

$$Hx + n$$

Meanwhile, the number of rows and columns of the channel matrix H indicating the channel state is determined by the number of transmit and receive antennas. The number of rows of the channel matrix H is equal to the number NR of receive antennas and the number of columns thereof is equal to the number NR of transmit antennas. That is, the channel matrix H is an NR×NT matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \qquad \text{[Equation 11]}$$

Additionally, the rank of a matrix can also be defined as the number of non-zero Eigen values when the matrix is Eigen-value-decomposed. Similarly, the rank of a matrix can be defined as the number of non-zero singular values when the matrix is singular-value-decomposed. Accordingly, the physical meaning of the rank of a channel matrix can be the maximum number of channels through which different pieces of information can be transmitted.

In this description, "rank" for MIMO transmission refers to the number of paths capable of independently transmitting a signal at a specific time and using specific frequency resources and the "number of layers" refers to the number of signal streams transmitted through each path. In general, since a transmission end transmits layers corresponding in number to the number of ranks used for signal transmission, the rank has the same meaning as the number of layers unless stated otherwise.

PSS (Primary Synchronous Signal)/SSS (Secondary Synchronous Signal)

Figure 6:
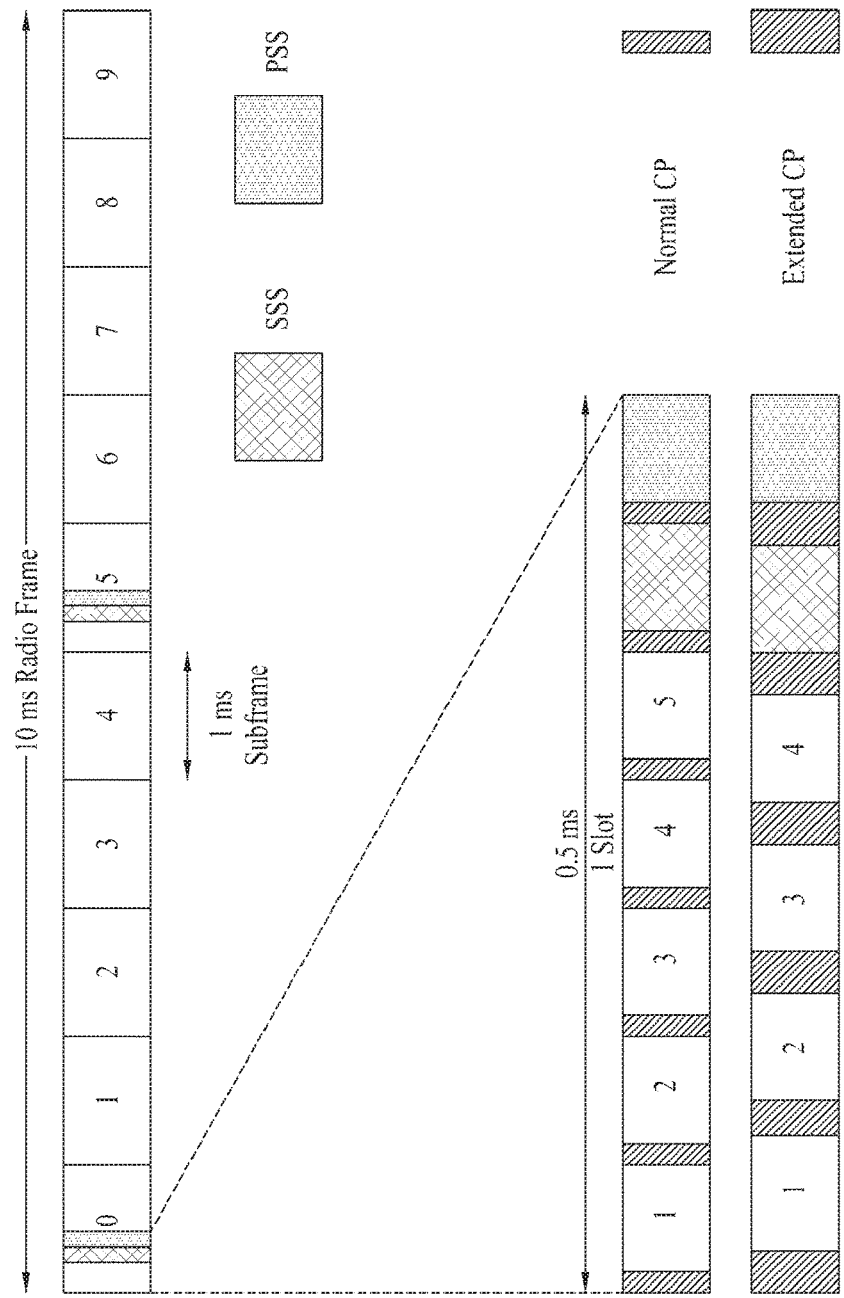
FIG. 6 is a diagram showing a PSS and an SSS of a 3GPP system.

FIG. 6 is a diagram for explaining a PSS and an SSS corresponding to synchronization signals used for a cell search in LTE/LTE-A system. Before the PSS and the SSS are explained, a cell search is explained. When a user equipment initially accesses a cell, the cell search is performed for a case of performing a handover from the currently accessed cell to a different cell, a case of reselecting a cell or the like. The cell search may include acquisition of frequency and symbol synchronization for a cell, acquisition of downlink frame synchronization for a cell and determination of a cell identifier (ID). One cell group consists of three cell identifiers and there may exist 168 cell groups.

An eNB transmits a PSS and an SSS to perform a cell search. A user equipments obtains 5 ms timing of a cell by detecting the PSS and may be able to know a cell identifier included in a cell group. And, the user equipment is able to know radio frame timing and a cell group by detecting the SSS.

Referring to FIG. 6, a PSS is transmitted in a $0^{th}$ and a $5^{th}$ subframe. More specifically, the PSS is transmitted on the last ODFM symbol of a first slot of the $0^{th}$ subframe and the last OFDM symbol of a first slot of the $5^{th}$ subframe, respectively. And, the SSS is transmitted on the last but one OFDM symbol of the first slot of the $0^{th}$ subframe and the last but one OFDM symbol of the first slot of the $5^{th}$ subframe, respectively. In particular, the SSS is transmitted on an OFDM symbol right before an OFDM symbol on which the PSS is transmitted. The aforementioned transmission timing corresponds to a FDD case. In case of TDD, the PSS is transmitted on a third symbol of the $1^{st}$ subframe and a third symbol of a $6^{th}$ subframe (i.e., DwPTS) and the SSS is transmitted on the last symbol of a $0^{th}$ subframe and the last symbol of a $5^{th}$ subframe. In particular, the SSS is transmitted on a symbol preceding as many as 3 symbols of a symbol on which the PSS is transmitted in the TDD.

The PSS corresponds to a Zadoff-Chu sequence of a length of 63. The PSS is actually transmitted on 73 center subcarriers (72 subcarriers except a DC subcarrier, i.e., 6 RBs) of a system frequency bandwidth in a manner that 0 is padding to both ends of the sequence. The SSS consists of a sequence of a length of 62 in a manner that two sequences each of which has a length of 31 are frequency-interleaved. Similar to the PSS, the SSS is transmitted on the center 72 subcarriers of the whole system bandwidth.

PBCH (Physical Broadcast Channel)

Figure 7:
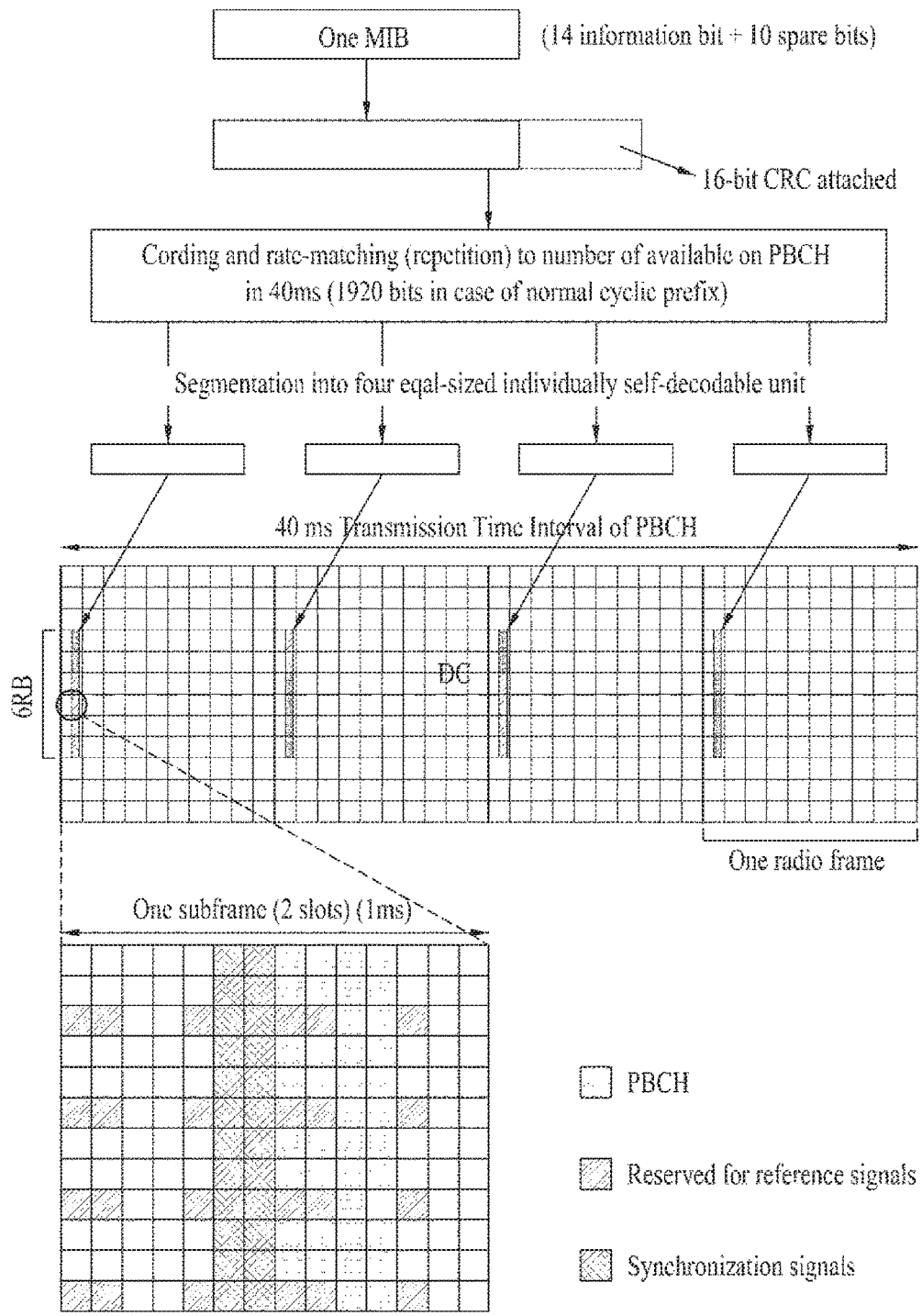
FIG. 7 is a diagram showing a PBCH of a 3GPP system.

FIG. 7 is a diagram for explaining PBCH. The PBCH corresponds to a channel on which system information corresponding to a master information block (MIB) is transmitted. The PBCH is used to obtain system information after a user equipment obtains synchronization and a cell identifier via the aforementioned PSS/SSS. In this case, downlink cell bandwidth information, PHICH configuration information, a subframe number (a system frame number (SFN)) and the like can be included in the MIB.

As shown in FIG. 7, one MIB transport block is transmitted via a first subframe in each of 4 consecutive radio frames. More specifically, PBCH is transmitted on first 4 OFDM symbols of a second slot of a $0^{th}$ subframe in the 4 consecutive radio frames. Hence, the PBCH configured to transmit a MIB is transmitted with an interval of 40 ms. The PBCH is transmitted on center 72 subcarriers of a whole bandwidth in frequency axis. The center 72 subcarriers correspond to 6 RBs corresponding to a smallest downlink bandwidth. This is intended to make a user equipment decode BCH without any problem although the user equipment does not know a size of the whole system bandwidth.

Initial Access Procedure

Figure 8:
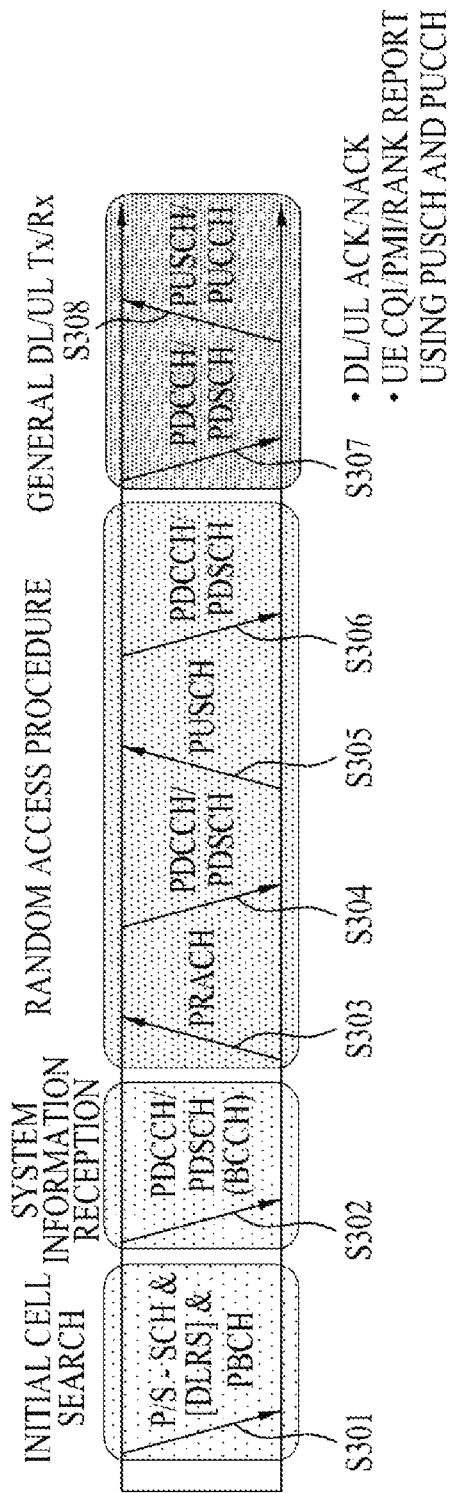
FIG. 8 is a diagram showing an initial access procedure of a 3GPP system and a method for transmitting and receiving a signal.

FIG. 8 is a diagram showing an initial access procedure of a 3GPP system and a method for transmitting and receiving a signal using physical channels.

When power is turned on or the UE enters a new cell, the UE performs an initial cell search procedure such as acquisition of synchronization with an eNB (S301). To this end, the UE may adjust synchronization with the eNB by receiving a PSS and an SSS from the eNB and acquire information such as a cell identity (ID). Thereafter, the UE may acquire broadcast information within the cell by receiving a physical broadcast channel (PBCH) from the eNB. Meanwhile, in the initial cell search procedure, the UE may monitor a DL channel state by receiving a downlink reference signal (DL RS).

Upon completion of the initial cell search procedure, the UE may acquire more detailed system information by receiving a physical downlink control channel (PDCCH) and receiving a physical downlink shared channel (PDSCH) based on information carried on the PDCCH (S302).

Meanwhile, if the UE initially accesses the eNB or if radio resources for signal transmission to the eNB are not present, the UE may perform a random access procedure (S303 to S306) with the eNB. To this end, the UE may transmit a specific sequence through a physical random access channel (PRACH) as a preamble (S303 and S305) and receive a response message to the preamble through the PDCCH and the PDSCH associated with the PDCCH (S304 and S306). In the case of a contention-based random access procedure, the UE may additionally perform a contention resolution procedure.

After performing the above procedures, the UE may receive a PDCCH/PDSCH (S307) and transmit a physical uplink shared channel (PUSCH)/physical uplink control channel (PUCCH) (S308), as a general UL/DL signal transmission procedure. Especially, the UE receives downlink control information (DCI) through the PDCCH. The DCI includes control information such as resource allocation information for the UE and has different formats according to use purpose thereof.

Meanwhile, control information that the UE transmits to the eNB on UL or receives from the eNB includes a DU/UL acknowledgment/negative acknowledgment (ACK/NACK) signal, a channel quality indicator (CQI), a precoding matrix index (PMI), a rank indicator (RI), and the like. In the 3GPP LTE system, the UE may transmit the control information such as CQI/PMI/RI through a PUSCH and/or a PUCCH.

Synchronization Acquisition of D2D UE

Hereinafter, description will be given of acquisition of synchronization between D2D UEs in D2D communication based on the above description and the legacy LTE/LTE-A system. D2D means direct communication between UEs, and the term 'D2D' may be replaced with or referred to as a sidelink. The D2D UE means a UE that supports D2D. In the OFDM system, if time/frequency synchronization is not matched, OFDM signals may not be multiplexed between different UEs due to inter-cell interference. Moreover, it is not efficient that all D2D UEs individually match synchronization by directly transmitting and receiving synchronization signals. Accordingly, in a distributed node system such as the D2D system, a specific node may transmit a representative synchronization signal and the other D2D UEs may match synchronization with reference to the representative synchronization signal. In other words, a scheme may be used in which some nodes (e.g., eNB, UE or synchronization reference node or synchronization source) periodically transmit D2D synchronization signals (D2DSSs) and the other UEs transceive signals by matching synchronization with reference to the D2D synchronization signals.

A transmission period of the D2DSS is not smaller than 40 ms, and one or more symbols may be used for transmission of the D2DSS at a subframe.

The D2DSS may include PD2DSS (primary D2DSS) and SD2DSS (secondary D2DSS). The term 'PD2DSS' may be replaced with/referred to as the term 'PSSS (Primary Sidelink synchronization signal)', and the term 'SD2DSS' may be replaced with/referred to as the term 'SSSS (Secondary Sidelink synchronization signal)'. The PD2DSS may have a form of a predetermined length of Zadoff-chu sequence or have a structure similar to/modified from/obtained by repeating that of the PSS. The SD2DSS may have a form of M-sequence or have a structure similar to/modified from/obtained by repeating that of the SSS.

The same priority reference should be applied when the D2D UE selects a D2D synchronization source. If signal strength of all received D2DSSs at out-coverage status is a predetermined value or less, the D2D UE may be a synchronization source. The D2D UE may be set to a synchronization source by indication of the eNB at in-coverage status. If D2D UEs match synchronization with each other with reference to the eNB, the synchronization source may be the eNB, and the D2DSS may be the PSS/SSS. D2DSS of the synchronization source guided from the eNB may be different from that of the synchronization source which is not guided from the eNB.

A physical D2D synchronization channel (PD2DSCH) may mean a broadcast channel for carrying basic system information (e.g., D2DSS related information, duplex mode (DM), TDD UL/DL configuration, information on a resource pool, a type of an application associated with D2DSS, etc.) which a UE needs to know before transmitting and receiving a D2D signal. The term 'PD2DSCH' may be referred to as 'PSBCH (Physical Sidelink Broadcast Channel)'. The PD2DSCH may be transmitted on the same subframe as the D2DSS.

The D2DSS may be a type of a specific sequence, and the PD2DSCH may have the form of a sequence representing specific information or the form of a codeword obtained through predetermined channel coding. In this case, the SRN may be the eNB or the D2D UE. In the case of 'partial network coverage' or 'out of network coverage', the D2D UE may be the synchronization source.

Figure 9:
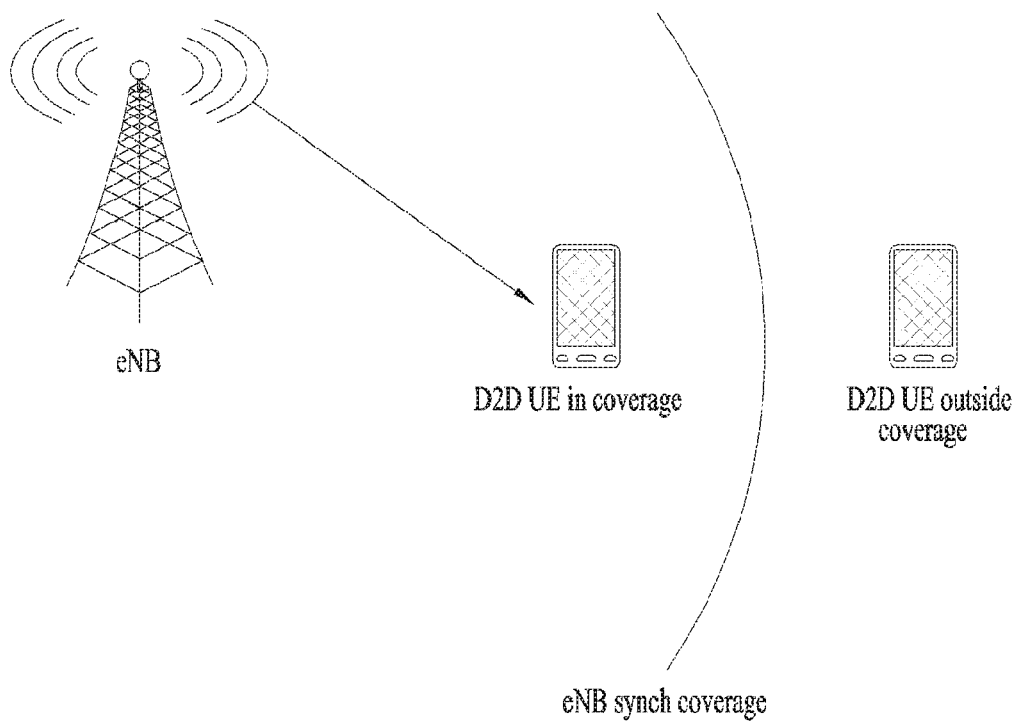
FIG. 9 is a diagram showing D2D communication according to one embodiment of the present invention.

For D2D communication with an out of coverage UE in the status of FIG. 9, the D2DSS may be relayed. Also, the D2DSS may be relayed through a multi-hop. In the following description, relay of the synchronization signal may include transmission of a D2D synchronization signal of a separate format to match with a synchronization signal reception timing as well as direct AF relay of a synchronization signal of the eNB. In this way, as the D2D synchronization signal is relayed, direct communication may be performed between an in-coverage D2D UE and an out-coverage D2D UE.

Generation of D2D Synchronization Signal

As described above, the D2D operation is configured based on the LTE/LTE-A system, and the PD2DSS and the SD2DSS are also generated based on the PSS/SSS of the LTE/LTE-A.

A sequence of the PSS transmitted from the eNB in the LTE/LTE-A is generated as expressed by the following Equation 12.

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \quad \text{[Equation 12]}$$

In the Equation 12, u is a root index of Zadoff-Chu sequence. One of {25,29,34} is selected as the root index u, and physical cell ID($N_{ID}^{Cell}$) is generated based on the selected value. In more detail, the physical cell ID is given by $N_{ID}^{Cell}=3N_{ID}^{(1)}+N_{ID}^{(2)}$. $N_{ID}^{(1)}$ is one of 0~167 deduced from SSS sequence, and $N_{ID}^{(2)}$ is one of 0~2 deduced from PSS sequence. $N_{ID}^{(2)}=0, 1, 2$ correspond to the root indexes {25,29,34}, respectively.

The set {25,29,34} of the root indexes used for generation of the PSS has been selected considering a PAPR (Peak-to-Average Power Ratio), a Cubic metric, frequency offset sensitivity, etc. Since 29 and 34 of the root indexes have a root symmetry property on a time domain in view of property of the Zadoff-Chu sequence, each value of the sequences generated by the root indexes 29 and 34 is represented in the form of a complex conjugate at the same position. That is, a pair of root indexes in which sum of the root indexes is the same as a length of the Zadoff-Chu sequence have a property of a complex conjugate. Therefore, even though any one of a pair of root indexes is only used, since the sequence generated through the other one of the root indexes may be detected, correlator complexity of the receiver may be attenuated.

The PD2DSS/SD2DSS may be configured based on the LTE PSS/SSS. For example, the Equation 12 for generating the PSS sequence of the LTE may be reused to generate the PD2DSS. Since the generated PSS sequence of the LTE is transmitted at a DL resource by the eNB but D2D communication is performed on a UL resource, the PD2DSS is transmitted from the UL resource by the synchronization source.

Meanwhile, when the Equation 12 for generating the PSS sequence of the LTE is reused to generate the PD2DSS, a problem occurs whether the root indexes 25, 29, 34 of the PSS may be reused. In case of FDD, even though the root indexes of the PSS are used as they are, since a frequency bandwidth of the UL resource is different from that of the DL resource, if symbol positions of the PD2DSS and the PSS are configured differently from each other, there is no problem in detecting each of the PSS and the PD2DSS.

However, in case of TDD, if the root indexes of the LTE PSS are reused as they are, the legacy UE that supports LTE but does not support D2D may be operated in error. For example, since the legacy UE which desires to initially access the eNB cannot know UL-DL subframe configuration of the TDD, the legacy UE cannot identify a subframe belonging to the UL resource from a subframe belonging to the DL resource temporally. Therefore, when the legacy UE attempts to detect the PSS/SSS for initial access, the legacy UE continuously monitors subframes regardless of temporal identification of the UL/DL. At this time, there is a D2D UE, which is operated as a D2D synchronization source, near the legacy UE, the legacy UE may detect the PD2DSS of the D2D UE, which has a relatively high reception power, but may not detect the PSS/SSS transmitted from the eNB. To prevent this error operation from occurring, it is preferable that the root indexes of the PD2DSS sequence are defined differently from those of the PSS sequence of the LTE.

Based on the aforementioned discussion, embodiments for configuring root indexes used for generation of the PD2DSS sequence will be described in more detail.

Embodiment in which a Single PD2DSS Root Index is Defined

In this embodiment, a single root index is defined for the PD2DSS. For example, only 38 may be used as the root index of the PD2DSS. In the legacy LTE, three sectors are assumed and root indexes of one PSS are allocated to each sector but identification of the sectors may not be required in D2D communication. Also, when a correlator detects the PD2DSS, since good performance may be expected if the number of PD2DSS root index candidates becomes small, it is favorable to define one PD2DSS root index in view of complexity attenuation. The root index 38 configures a pair with the legacy LTE PSS root index 25. That is, since root indexes 38 and 25 have a root symmetry property on the time domain, complexity of correlation calculation may be attenuated.

For example, in the TDD system, the D2D UE performs correlation based on the root indexes {25, 29, 34} for the PSS during initial access. When correlation for the root index 25 is performed, correlation for the root index 38 may be deduced together with the correlation for the root index 25. In this case, the out-of-coverage D2D UE may perform cell synchronization and D2D synchronization at the same time without great increase of complexity.

Embodiment in which Two PD2DSS Root Indexes are Defined

In this embodiment, two root indexes are defined for the PD2DSS. The first root index of the two root indexes may correspond to PD2DSS of an in-coverage synchronization source D2D UE, and the second root index may correspond to PD2DSS of an out-of-coverage synchronization source D2D UE.

The two root indexes may be selected considering a PAPR, a Cubic metric, frequency offset sensitivity, etc. For example, the two root indexes may be selected from 22, 26, 37. At this time, since a sum of the root index 26 and the root index 37 corresponds to a length 63 of Zadoff-Chu sequence, the root indexes have root symmetry property on the time domain.

The D2D UE may attempt to detect the PD2DSS by first using an in-coverage root index of two root indexes. If detection of the PD2DSS using the in-coverage root index is failed, the D2D UE may attempt to detect the PD2DSS by using an out-of-coverage root index.

Meanwhile, according to one embodiment, two root indexes may be defined as {38, M}. At this time, the root index 38 may be used for in-coverage. A PSS root index 25 that configures a pair with the root index 38 is defined in the legacy LTE. Therefore, the D2D UE within the in-coverage may detect the PD2DSS based on the root index 38 by performing correlation using the PSS root index 25. In this way, if the root index 38 is used for in-coverage, it is advantageous that the D2D UE may perform detection of the PD2DSS while maintaining relatively low complexity. Another one root index M in addition to the root index 38 may be 22, 26, or 37, for example.

Embodiment in which Three PD2DSS Root Indexes are Defined

In this embodiment, three root indexes are defined for the PD2DSS. In the same manner as the PSS of the legacy LTE, three PD2DSS root indexes may be defined. For example, a root index 38 having a root symmetry property with a root index 25 of the PSS may be the first root index of the three PD2DSS root indexes. It is preferable that the second root index and the third root index of the three PD2DSS root indexes have a root symmetry property. For example, the second root index and the third root index may be 26 and 37, respectively.

If the root indexes of the PD2DSS are comprised of {38, 26, 37}, correlation complexity of the receiver is reduced as compared with the case that a root index having no relation with the LTE PSS is selected. For example, it is assumed that correlation complexity of one root index is 1 and correlation complexity for root indexes having a root symmetry property may be disregarded. If cell synchronization is only performed, that is, if the PSS is only detected, complexity becomes 2 (that is, correlation complexity of 1 for 'correlation complexity of 1 for root index 25+correlation complexity of 1 for root index pair (29, 34)). If cell synchronization and D2D synchronization are performed at the same time, complexity becomes 3 (that is, correlation complexity of 1 for 'root index pair (29, 34)+correlation complexity of 1 for root index pair (25, 38)+correlation complexity of 1 for root index pair (26. 27)). Therefore, complexity of 25% is reduced as compared with the case of the operation based on the root indexes regardless of the PSS.

D2DSS Identification of In/Out Network Coverage

In the embodiments in which a plurality of PD2DSS root indexes are defined, the D2D UE may distinguish the D2DSS from the synchronization source in network coverage and the D2DSS from the synchronization source out of network coverage, through the PD2DSS root indexes. For example, two root indexes are used, the first root index may be used if the synchronization source is within coverage, and the second root index may be used if the synchronization source is out of coverage.

In another embodiment, the D2D UE may distinguish the synchronization source within coverage from the synchronization source out of coverage through the SD2DSS selected from 168 IDs.

Also, if it is identified that there is the synchronization source D2D UE in/out of network coverage, the PD2DSS root index transmitted from the synchronization source D2D UE in coverage may be selected as a root index having low correlation with LTE PSS sequences so as not to affect a synchronization procedure of another UEs which belong to coverage.

According to still another embodiment of the present invention, the root index of the PD2DSS may be used to identify an entity of the synchronization source or a usage of the PD2DSS transmitted from the entity of the synchronization source. For example, 38 of the root indexes {38,M} may be used for the PD2DSS transmitted from the D2D UE which serves as a relay, and M may be used for the PD2DSS transmitted from a general D2D UE. In further still another embodiment, 38 may be used for the PD2DSS transmitted as a usage of public safety, and M may be used for the PD2DSS transmitted as a general usage.

Figure 10:
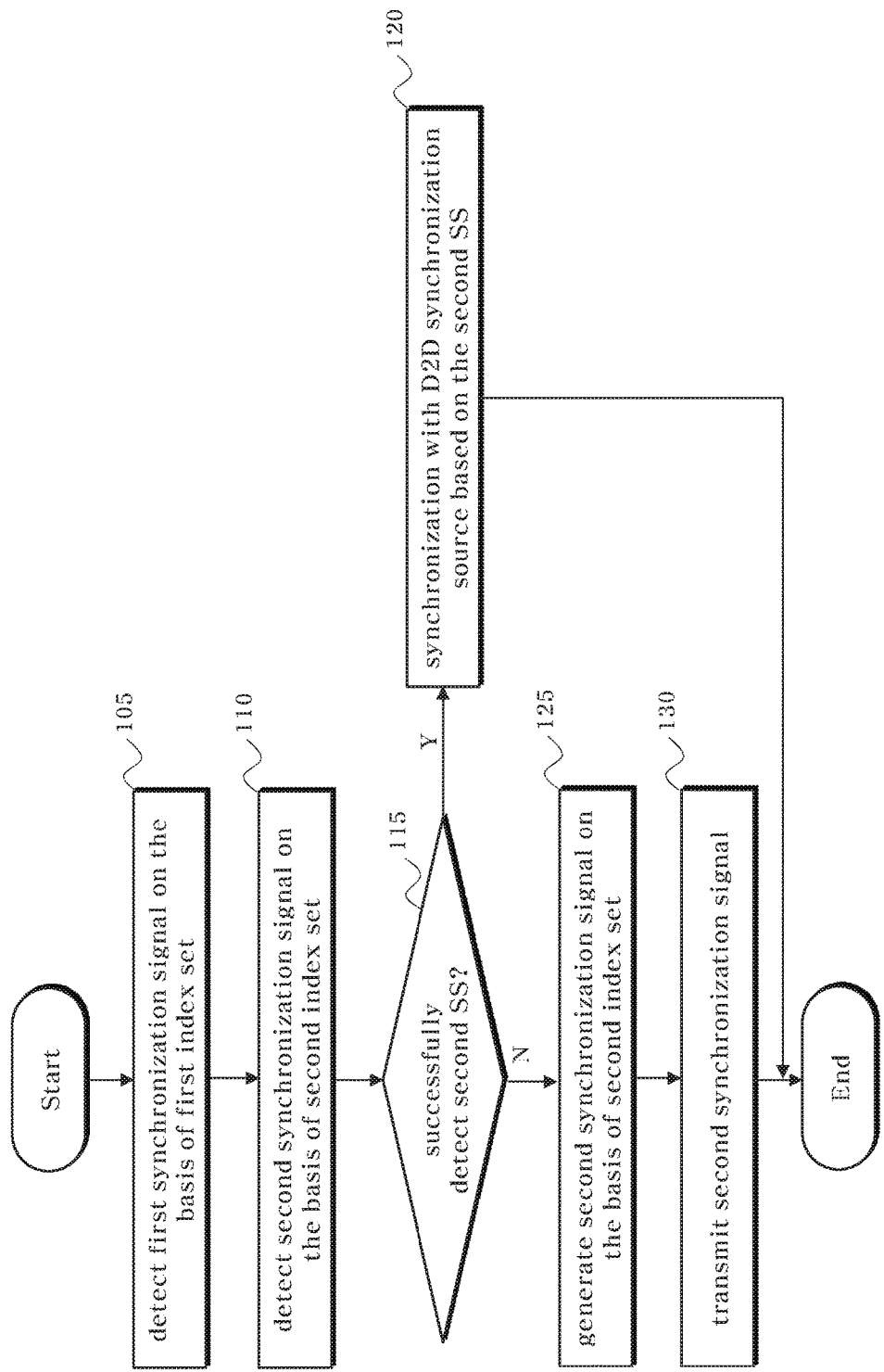
FIG. 10 is a diagram showing a method for transmitting and receiving a synchronization signal according to one embodiment of the present invention.

Method for Transmitting and Receiving Synchronization Signals According to the Embodiments of the Present Invention FIG. 10 is a diagram showing a flow of a method for transmitting and receiving a synchronization signal to and from a UE, which supports D2D, according to one embodiment of the present invention. The repeated description of the aforementioned description will be omitted.

The UE performs detection of a first synchronization signal transmitted from a network on the basis of a first index set having a plurality of root indexes for Zadoff-Chu sequence (105). Detection of the first synchronization signal based on the first index set includes the case that Zadoff-Chu sequences generated/stored previously by the first index set are used. The first synchronization signal may include PSS and SSS, which are mapped on downlink resources. The first synchronization signal may be transmitted in an orthogonal frequency division multiple access (OFDMA) scheme. A total number of root indexes of the first index set is 3, and may include root indexes '25', '29' and '34'.

The UE performs detection of a second synchronization signal transmitted from the D2D synchronization source on the basis of a second index set having a plurality of root indexes which are different from the plurality of root indexes of the first index set (110). For example, the D2D synchronization source may be the eNB or another D2D UE. Detection of the second synchronization signal based on the second index set includes the case that Zadoff-Chu sequences generated/stored previously by the second index set are used. The second synchronization signal may include PD2DSS and SD2DSS, which are mapped on uplink resources. The second synchronization signal may be transmitted in a single carrier-frequency division multiple access (SC-FDMA) scheme. A total number of root indexes of the second index set may be configured to a total number of root indexes of the first index set −1. For example, a total number of root indexes of the second index set may be 2. The second index set may include root indexes '26' and '37'.

According to one embodiment, any one of the root indexes included in the second index set may indicate that the D2D synchronization source is located out of coverage of the network, and the other one of the root indexes include in the second index set may indicate that the D2D synchronization sources is located within coverage of the network. Also, a sum of the two root indexes included in the second index set may correspond to the length of the Zadoff-Chu sequence.

According to another embodiment, at least one of a plurality of root indexes included in the second index set may be configured to a value having a root symmetric property with respect to at least one of the plurality of root indexes included in the first index set. Also, among the plurality of root indexes included in the second index set, a root index may be used within coverage of the network when a sum of the root index and a predetermined root index included in the first index set is '63'. Among the plurality of root indexes included in the second index set, a root index may be used out of coverage of the network when a sum of the root index and the predetermined root index included in the first index set is not '63'.

Meanwhile, detection of the second synchronization signal may be performed, but not limited to, when detection of the first synchronization signal is failed or when the UE gets out of network coverage after successfully detecting the first synchronization signal.

If the UE successfully detects the second synchronization signal (115), the UE performs synchronization with the D2D synchronization source that has transmitted the second synchronization signal (120).

If the UE fails to detect the second synchronization signal (115), the UE generates the second synchronization signal by selecting any one root index of the second index set (125). For example, the UE may select any one root index from the second index set depending on whether the UE is out of coverage of the network or in coverage of the network. If the UE is out of the network coverage, the UE may generate the second synchronization signal by using the first root index included in the second index set, and if the UE is within coverage of the network, the UE may generate the second synchronization signal by using the second root index included in the second index set.

The UE transmits the generated second synchronization signal (130).

In the shown embodiment, the UE generates and transmits the second synchronization signal when failing to detect the first synchronization signal and/or the second synchronization signal. However, the embodiment of the present invention is not limited to the shown embodiment. According to another embodiment, the UE may generate and transmit the second synchronization signal in accordance with a command of the eNB after successfully detecting the first synchronization signal and performing synchronization with the eNB.

Structure of Apparatus According to Embodiment of the Present Invention

Figure 11:
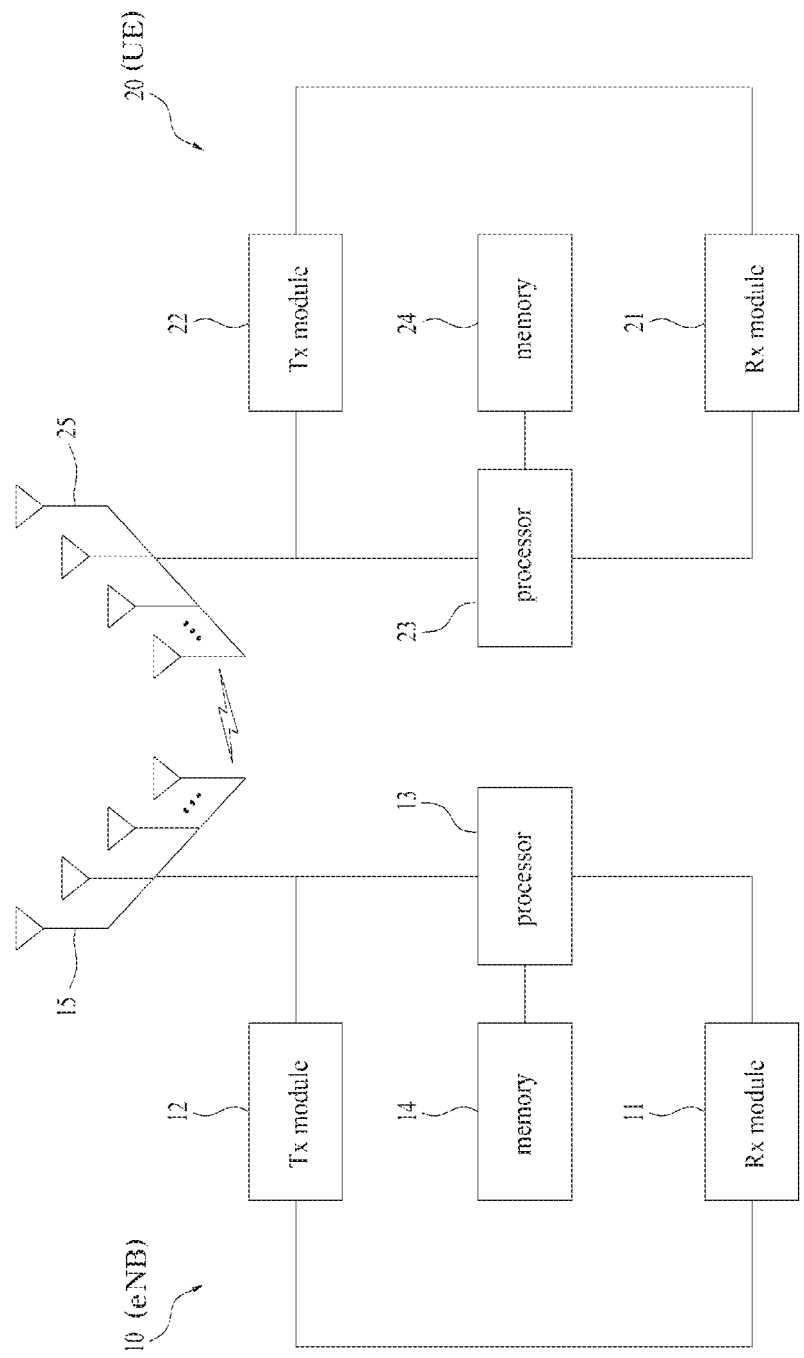
FIG. 11 is a diagram showing a configuration of a transceiving device according to one embodiment of the present invention.

FIG. 11 is a diagram showing the configuration of a transmission point apparatus and a UE apparatus according to an embodiment of the present invention.

Referring to FIG. 11, the transmission point apparatus 10 according to the present invention may include a reception module 11, a transmission module 12, a processor 13, a memory 14 and a plurality of antennas 15. Since the plurality of antennas 15 is used, the transmission point apparatus may support MIMO transmission/reception. The reception module 11 may receive a variety of signals, data and information from the UE in uplink. The transmission module 12 may transmit a variety of signals, data and information to the UE in downlink. The processor 13 may control the overall operation of the transmission point apparatus 10.

The processor 13 of the transmission point apparatus 10 according to one embodiment of the present invention may process operations necessary for the embodiments.

The processor 13 of the transmission point apparatus 10 may process information received by the transmission point apparatus 10 and information to be transmitted to an external device and the memory 14 may store the processed information for a predetermined time and may be replaced by a component such as a buffer (not shown).

Referring to FIG. 11, the UE apparatus 20 according to the present invention may include a reception module 21, a transmission module 22, a processor 23, a memory 24 and a plurality of antennas 25. Since the plurality of antennas 25 is used, the UE apparatus may support MIMO transmission/reception. The reception module 25 may receive a variety of signals, data and information from the eNB in downlink. The transmission module 22 may transmit a variety of signals, data and information to the eNB in uplink. The processor 23 may control the overall operation of the UE apparatus 20.

The processor 23 of the UE apparatus 20 according to one embodiment of the present invention may process operations necessary for the embodiments.

The processor 23 of the UE apparatus 20 may process information received by the UE apparatus 20 and information to be transmitted to an external device and the memory 24 may store the processed information for a predetermined time and may be replaced by a component such as a buffer (not shown).

In the above-described detailed configuration of the transmission point apparatus and the UE apparatus, details of the above-described various embodiments of the present invention may be independently applied or 2 or more embodiments may be applied at the same time. In this case, overlapping details will be omitted from the description for simplicity and clarity.

Furthermore, in the description of FIG. 11, the description of the transmission point apparatus 10 may also be equally applied to a device functioning as a downlink transmitter or an uplink receiver. The description of the UE apparatus 20 may also be equally applied to a relay station device functioning as an uplink transmitter or a downlink receiver.

The embodiments of the present invention can be implemented by a variety of means, for example, hardware, firmware, software, or a combination thereof.

In the case of implementing the present invention by hardware, the present invention can be implemented with application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory unit so as to be driven by a processor. The memory unit is located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

The aforementioned embodiments are achieved by combination of structural elements and features of the present invention in a predetermined manner. Each of the structural elements or features should be considered selectively unless specified separately. Each of the structural elements or features may be carried out without being combined with other structural elements or features. Additionally, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

INDUSTRIAL APPLICABILITY

The aforementioned embodiments of the present invention is applicable to various wireless mobile communication systems.

The invention claimed is:

1. A method for detecting synchronization signals by a user equipment (UE) that supports device to device (D2D) communication, the method comprising:
   detecting, by the UE, a first synchronization signal transmitted from a network based on a first index set having a plurality of root indexes for a Zadoff-Chu sequence;
   detecting, by the UE, a second synchronization signal transmitted from a D2D synchronization source based on a second index set having a plurality of root indexes which are different from the plurality of root indexes of the first index set; and
   determining, by the UE, whether or not the D2D synchronization source locates within a network coverage based on a root index used for the second synchronization signal,
   wherein, when a first root index of the second index set is used for the second synchronization signal, the UE determines that the D2D synchronization source locates out of the network coverage,
   wherein, when a second root index of the second index set is used for the second synchronization signal, the UE determines that the D2D synchronization source locates within the network coverage,
   wherein a total number of the plurality of root indexes of the second index set is 2, and a total number of the plurality of root indexes of the first index set is 3, and
   wherein a sum of the first root index that is used for out of the network coverage and any one of 3 root indexes included in the first index set is not '63'.

2. The method according to claim 1, wherein the first synchronization signal includes a primary synchronization signal (PSS) mapped on a downlink resource, and the second synchronization signal includes a primary D2D synchronization signal (PD2DSS) mapped on an uplink resource.

3. The method according to claim 1, wherein the first synchronization signal is transmitted in an orthogonal frequency division multiple access (OFDMA) scheme, and the second synchronization signal is transmitted in a single carrier-frequency division multiple access (SC-FDMA) scheme.

4. The method according to claim 1, wherein the first index set includes root indexes '25', '29' and '34', and the second index set includes root indexes '26' and '37'.

5. The method according to claim 1, wherein a sum of the first root index and the second root index which are included in the second index set, is configured to correspond to a length of the Zadoff-Chu sequence.

6. The method according to claim 1, wherein the first root index or the second root index included in the second index set is configured to a value having a root symmetric property with respect to at least one of the plurality of root indexes included in the first index set.

7. The method according to claim 1, wherein the detection of the second synchronization signal is performed when the detection of the first synchronization signal is failed.

8. The method according to claim 1, further comprising:
transmitting the second synchronization signal based on the second index set when both detection of the first synchronization signal and detection of the second synchronization signal are failed.

9. A method for transmitting a device to device (D2D) synchronization signal from a user equipment (UE) that supports D2D communication, the method comprising:
detecting, by the UE, a first synchronization signal transmitted from a network based on a first index set having a plurality of root indexes for a Zadoff-Chu sequence;
generating, by the UE, a second synchronization signal based on a second index set having a plurality of root indexes which are different from the plurality of root indexes of the first index set; and
transmitting, by the UE, the generated second synchronization signal,
wherein a total number of the plurality of root indexes of the second index set is 2, and a total number of the plurality of root indexes of the first index set is 3, and
wherein generating the second synchronization signal includes:
generating the second synchronization signal by using a first root index included in the second index set when the UE is out of a network coverage, and
generating the second synchronization signal by using a second root index included in the second index set when the UE is within the network coverage.

10. A user equipment (UE) for supporting device to device (D2D) communication, the UE comprising:
a receiver for receiving a radio frequency (RF) signal; and
a processor for controlling the receiver, wherein the processor:
detects a first synchronization signal transmitted from a network based on a first index set having a plurality of root indexes for a Zadoff-Chu sequence, and
detects a second synchronization signal transmitted from a D2D synchronization source based on a second index set having a plurality of root indexes which are different from the plurality of root indexes of the first index set, and
determines whether or not the D2D synchronization source locates within a network coverage based on a root index used for the second synchronization signal,
wherein, when a first root index of the second index set is used for the second synchronization signal, the processor determines that the D2D synchronization source locates out of the network coverage,
wherein, when a second root index of the second index set is used for the second synchronization signal, the processor determines that the D2D synchronization source locates within the network coverage,
wherein a total number of the root indexes of the second index set is 2, and a total number of the root indexes of the first index set is 3, and
wherein a sum of the first root index that is used for out of the network coverage and any one of 3 root indexes included in the first index set is not '63'.

11. A user equipment (UE) for supporting device to device (D2D) communication, the UE comprising:
a processor for:
detecting a first synchronization signal transmitted from a network based on a first index set having a plurality of root indexes for a Zadoff-Chu sequence, and
generating a second synchronization signal based on a second index set having a plurality of root indexes which are different from the plurality of root indexes of the first index set; and
a transmitter for transmitting the generated second synchronization signal,
wherein a total number of the plurality of root indexes of the second index set is 2, and a total number of the plurality of root indexes of the first index set 3,
wherein the processor generates the second synchronization signal by using a first root index included in the second index set when the UE is out of a network coverage, and
wherein the processor generates the second synchronization signal by using a second root index included in the second index set when the UE is within the network coverage.

* * * * *